3,770,710
BULK POLYMERIZATION OF DIOLEFINS

Shingo Futamura, Munroe Falls, and Thomas Chester Bouton, Akron, Ohio, assignors to The Firestone Tire & Rubber Company, Akron, Ohio
No Drawing. Continuation-in-part of applications Ser. No. 860,005, Sept. 22, 1969, and Ser. No. 132,189, Apr. 7, 1971. This application Aug. 23, 1971, Ser. No. 174,120
Int. Cl. C08f 1/04, 19/08; C08d 1/00
U.S. Cl. 260—83.7                                              6 Claims

ABSTRACT OF THE DISCLOSURE

In a process for bulk polymerizing liquid diene monomer to high molecular weight rubbery polymers in a system employing controlled evaporation of monomer for regulating polymerization temperature, excessive foaming with consequent loss of control of the polymerization is avoided by maintaining the polymerization temperature at a relatively low level until the polymer concentration has exceeded that at which the temperature of excessive foaming in the system is at a minimum. The polymerization temperature is then increased for completing the polymerization.

---

This application is a continuation-in-part of our copending application Ser. No. 860,005, filed Sept. 22, 1969, and of our application Ser. No. 132,189, filed Apr. 7, 1971, now both abandoned.

BACKGROUND OF THE INVENTION

For a number of years now polymeric diene rubbers such as polybutadienes, polyisoprenes and copolymers of dienes with other dienes or monoolefins have been produced commercially on a large scale by catalytic polymerization processes involving the use of large quantities of inert hydrocarbon solvents which must be separated from the rubber and recycled. The cost of the solvent itself added to the cost of the rubber. Recovery and separation of the rubber from the solvent has been attended by difficulties and has required added treatment and equipment all of which increased further the cost of the rubber.

While it has long been known that polymerization can be carried out in the absence of solvent, bulk polymerization has not been considered commercially feasible for producing high molecular weight synthetic rubbers on a large scale because of the highly exothermic nature of the polymerizations, the high viscosities encountered, and the difficulties accompanying control of polymerization rates.

PRIOR ART

Although continuous bulk polymerization of butadiene to low molecular weight liquid polymers is described in East German Pat. 61,103 and control of temperature is referred to, no mode of temperature control is described. Control of bulk polymerization has been proposed by employment of the long-appreciated device of cooling a reaction zone by controlled evaporation of and removal of a portion of a liquid reactant or medium therefor from the reaction zone. This is sometimes referred to as autorefrigeration. British Pat. 1,138,627 discloses removing polymerization heat by evaporating and condensing one or more liquids during emulsion, solution and suspension polymerization of olefinically unsaturated monomers. A recent description of employing autorefrigeration in bulk polymerization appears in U.S. Pat. 3,458,490. However, even employing such a device in bulk polymerizing liquid monomer it is found that shortly after initiation of polymerization, uncontrollable foaming of the liquid monomer may set in, which defeats completely operation of the evaporation-condensing system despite employment of agitating, monomer spraying or other foam-breaking techniques. Under such circumstances the heat of polymerization can no longer be removed from the reactor, with consequent ruining of the polymer at the best or catastrophe at the worst. The use of solvent spray as a foam-breaking technique is described in U.S. Pat. 3,062,796 in connection with autorefrigeration in solution polymerization of diene monomers. Such technique, though effective according to this patent in breaking foams experienced in polymerizing dilute solutions of diene monomers in inert solvent is ineffective as will be seen later in controlling certain foaming experienced in bulk polymerization.

SUMMARY OF THE INVENTION

It has surprisingly been found in accordance with this invention that for a given monomer and amount thereof, and a given catalyst and concentration thereof, and in a reactor of given geometry including size, shape, particular means for regulating reaction temperature by monomer evaporation, and particular agitating or other foam-breaking means, the temperature at which excessive foaming occurs (hereafter referred to as "the foaming temperature") in the reactor during bulk polymerization decreases to a critical minimum (hereafter referred to as "the critical minimum foaming temperature") as the total solids increases to a critical polymer concentration (hereafter referred to as "the critical polymer concentration") and thereafter the temperature at which excessive foaming occurs increases rapidly with increasing total solids formation to complete conversion or any desired intermediate stage of polymerization conversion.

DESCRIPTION OF THE INVENTION

Taking advantage of this unexpected phenomenon, the present invention is illustrated by a series of experiments conducted in connection with a reactor system depicted diagrammatically in Figure 1. The system of Figure 1 included a twenty-gallon reactor (1) provided with a mechanical agitator (2), a condenser (3) for receiving and condensing a controlled amount of monomer vapor for maintaining a desired temperature in the reactor, and a reservoir (4) for collecting condensed monomer and returning liquid monomer to the reactor. These experiments involved polymerization of liquid butadiene-1,3 with n-butyllithium catalyst concentrations calculated to provide polybutadiene rubbers of approximately 5 to 120 Mooney (ML$_4$ @ 100° C.). Liquid monomer was employed in an amount to half fill the reactor, thus leaving approximately half of the reactor available for permissible foaming. Agitation was constant throughout the experiments.

Results of these experiments are exemplified by the graph of Figure 2. In the area above the curve, excessive foaming occurs and the temperature rises to such a level that the polymerization cannot be controlled; foam fills and overflows the reactor despite surface spraying or other normal foam-controlling techniques with consequent inactivation of the evaporation-condensing system. In the area below the curve, foaming is not excessive, the temperature can be controlled by evaporation and polymerization is thus completely controllable by the evaporation-condensing system. Thus, as long as the polymerization temperature during the initial stage of polymerization does not exceed the descending portion of the curve the temperature can, after the critical polymer concentration is exceeded, be rapidly increased above the critical minimum foaming temperature with consequent desirable increased polymerization rate. It is noted that a particularly troublesome stage of the polymerization is at polymer concentrations in the range of about 20 to 40 percent. During this stage the temperature should be maintained by controlled evaporation so as not to exceed substantially 40° C. After passing this stage the polymerization temperature can be rapidly raised without difficulty to the order of 50° C. to 70° C. with a finishing off of the polymerization at temperatures of the order of 100° C. to 150° C. if desired.

Polymerization can, if desired, be completed in the original reactor. Alternatively, and in continuous polymerization desirably, polymerization in the original reactor is carried to a point of conversion where the polymer-monomer solution is still pumpable; the polymer-monomer solution is then removed from the original reactor and led to a further treatment zone wherein polymerization is completed and/or the polymer is recovered from the monomer. Once the polymerization has passed the critical polymer concentration and the temperature has been raised to a desired higher level above the critical minimum foaming temperature but below the foaming temperature for the higher polymer concentration, monomer and catalyst can be fed into the reactor continuously and polymer can be withdrawn continuously, both at controlled rates to maintain the solids content above the critical polymer concentration, continuous polymerization being carried out at the desirable higher temperature. Thus continuous polymerization is carried out in accordance with the invention at temperatures above those at which the process could otherwise be brought on stream. Polymer-monomer solution can desirably be processed through an extruder wherein polymerization is continued to any further desired polymerization, excess monomer recovered and recycled and dry polymer obtained.

It should be noted that the graph of Figure 2 is specific for producing polybutadiene of a given range of molecular weights with a given monomer volume in a reactor of gven geometry. Production of polybutadiene of different molecular weight in the same reactor system shifts the curve to the right or slightly to the left depending upon whether the desired molecular weight of the polybutadiene is respectively substantially lower or higher than the molecular weight of the polybutadiene for which Figure 2 is characteristic. With increase or decrease of the monomer volume the curve separating the areas of excess uncontrollable foaming from the area of controllable foaming shifts the curve respectively down or up. Similarly, the curve shifts laterally and/or up and down with variation in the geometry of the reactor system. So too, the precise location of the critical curve may change laterally and/or vertically when monomers other than butadiene itself are polymerized and when catalysts other than butyllithium are employed. Nevertheless, as previously stated, the temperature at which excess foaming occurs in any given reactor system for producing any given polymer reaches a critical minimum value at a critical polymer concentration and increases rapidly thereafter with increased polymer concentration.

Generally, any of the conjugated dienes can be beneficially employed in practice of the invention. Representative of these are butadiene-1,3, isoprene, piperylene, 2,3-dimethyl-1,3-butadiene and the like. Monoolefinic monomers normally employed when desired for copolymerizing with dienes in practice of the invention include styrene, methyl styrene, acrylonitrile and the like.

Catalysts used in practice of the invention include systems well known to those skilled in the art. Such systems include without limitation the multi-component systems represented by mixtures of a reducing agent with a heavy metal compound such as combinations of a titanium iodide or chloride with triethyl or triisobutyl aluminum, a cobalt salt such as cobalt octoate with for example diethyl aluminum chloride or ethyl aluminum sesquichloride, a nickel salt such as nickel salicylate with boron trifluoride and an alkyl aluminum, a titanium chloride with an imino alane and the like; and the alkali metal containing catalysts generally. Illustrative lithium-containing catalysts are disclosed in U.S. Pat. 3,317,918. Hydrocarbon lithium catalysts are preferred.

Particularly advantageous continuous bulk polymerization in accordance with the invention is a multi-zone process wherein polymerization is carried out in a series of zones, the temperature in the initial and at least one of the succeeding zones being controlled by evaporation and condensation of liquid monomer. In the initial zone polymerization is conducted at a temperature not exceeding the foaming temperature for the system of this zone to a conversion where the polymer-monomer solution is still pumpable. In subsequent zones, which advantageously can comprise a screw extruder provided with feeding, conveying and one or more vapor venting sections associated for control of temperature within the extruder with the condenser system of the initial zone, polymerization is continued at temperatures substantially elevated from the critical minimum foaming temperature for the system of the initial zone until dry polymer is obtained. While polymerization of diene monomer has heretofore been carried out in an extruder, to our knowledge temperature control within such an extruder has not heretofore been effected by evaporation and condensation of liquid monomer therefrom.

Illustrative continuous bulk polymerization in accordance with the invention has been carried out in a system depicted diagrammatically in Figure 3. The system of Figure 3 included a 40-gallon reactor (5) provided with a mechanical agitator (6), a condenser (7) for receiving and condensing a controlled amount of monomer vapor for maintaining a desired temperature, and a reservoir (8) for collecting condensed monomer and returning liquid monomer to reactor (5). A controllable outlet means was provided in reactor (5) which communicated by pump (9) and conduit (10) for conveying polymer-monomer solution from reactor (5) to a ventable screw type extruder (11) by way of a feed port therein (F). The extruder was further provided with controllable vent means V-1, V-2 and V-3 for controlled venting of monomer vapor from the extruder, these vent means communicating by suitable conduit means generally indicated as (12) to condenser (7) whereby temperature within the zones of the extruder could be regulated by controlled evaporation of liquid monomer. Reactor (5) and extruder (11) were provided with jacketing means and the screw of the extruder was provided with internal heating and cooling means, not shown, for supplemental temperature regulation. It has surprisingly been discovered in accordance with the invention that in bulk polymerizing butadiene - 1,3 undesirable polymer build-up on the walls of a reactor employed as the initial polymerization zone is avoided if the reactor wall is maintained at a temperature at least 3° C. less than the polymerization temperature; preferably, this temperature differential is in the range of 3° C. to 10° C. The following with reference to the system of Figure 3 illustrates multi-zone continuous bulk polymerization of butadiene-1,3 in accordance with the invention.

One hundred fifty pounds of butadiene-1,3 containing 750 parts per million of butadiene-1,2 was introduced into reactor (5). The butadiene-1,2 was employed as a supplemental temperature controlling agent in accordance with our application serial number 132,189; in the practice of this invention it is employed in the amount of from 500 to 2500 and preferably from 750 to 1250 parts by weight per million parts by weight of monomer. Two hundred twenty-seven milliliters of 15% n-butyllithium was added. The reactor was heated to about 32° C. for starting polymerization. This temperature was approximately maintained by controlled evaporation of monomer from reactor (5), condensation of the monomer vapor by condenser (7), and return of liquid monomer to the reactor. One hour and 30 minutes after the start of polymerization in reactor (5) and when the polymer-monomer concentration therein had reached 27%, continuous withdrawal of polymer-monomer solution from reactor (5) and transfer of same to the feed port of extruder (11) was begun, liquid butadiene-1,3 monomer, butadiene-1,2 and n-butyllithium being continuously metered into reactor (5) at rates suitable for maintaining their proportions as the proportions initially charged. Water for the jacket sections of the extruder from V-1 through V-3 was maintained at about 121° C. to increase the polymerization rate and to complete the polymerization. Water being fed into the center of the screw of the extruder was maintained at about 27° C. Controlled removal of a portion of the heat of polymerization within the extruder was accomplished in accordance with the invention by withdrawing a controlled portion of the monomeric butadiene vapor from the extruder by way of V-1, V-2 and V-3, condensing same in condenser (7) and returning liquid monomer to reactor (5) by way of reservoir (8). Since this monomer was uncontaminated by solvent, terminating agents, antioxidants, etc., no purification was required before re-introducing it into the reactor. Polymerization of monomeric butadiene was partially effected in reactor (5) at a relatively low temperature, was completed in extruder (11) at an elevated temperature, and dry, solid polybutadiene rubber was obtained continuously from the extruder. Antioxidant and other additives can, if desired, be added to the rubber near the exit end of the extruder.

Logs of continuous bulk polymerization of butadiene monomer to dry polymer in the multi-zone system of Figure 3 follow. The temperatures reported in the log of operation of reactor (5) are measured temperatures of the liquid phase. The temperatures for V-1 reported in the log of the operation of extruder (11) are the temperatures of butadiene vapor corresponding to the butadiene vapor pressures measured at V-1; the temperatures of the liquid phase within the extruder (unmeasured) necessarily were substantially greater than the reported vapor temperature at V-1.

LOG OF OPERATION OF REACTOR (5)

| Time, hrs.:min. | Temp., °C. | Pressure, p.s.i.g. | Conversion, percent | Remarks |
|---|---|---|---|---|
| 09:45 | | | | Charge of monomer. |
| 10:45 | 22.2 | 40 | 0.0 | Injected catalyst. |
| 11:15 | 30.0 | 40 | 7.8 | |
| 11:30 | 30.6 | 40 | 13.8 | |
| 11:45 | 32.8 | 42 | 16.0 | |
| 12:00 | 32.8 | 40 | 20.1 | |
| 12:15 | 32.2 | 40 | 27.0 | Began continuous transfer of polymer-monomer solution to feed section of extruder. |
| 12:20 | 32.2 | 39 | 26.8 | |
| 13:00 | 32.2 | 38 | 32.8 | Began continuous introduction of catalyst and monomer. |
| 13:30 | 31.1 | 39 | | |
| 14:00 | 31.1 | 38 | 25.3 | |
| 14:30 | 27.2 | 35 | | |
| 15:00 | 32.2 | 40 | | |
| 15:30 | 31.7 | 40 | | |
| 16:00 | 31.1 | 39 | | |
| 16:30 | 30.6 | 37 | | |
| 16:50 | 30.0 | 37 | | |
| 17:00 | 30.0 | 37 | | |
| 17:30 | 30.6 | 37 | | |
| 18:00 | 31.1 | 38 | | |
| 19:05 | 29.4 | 36 | | |
| 19:33 | 27.2 | 35 | 25 | |
| 20:07 | 26.7 | 36 | 25 | |
| 20:30 | 25.6 | 30 | 25 | |
| 21:05 | 25.0 | 33 | | |
| 21:30 | 16.7 | 33 | | |
| 21:45 | 20.0 | 9 | | Terminated polymerization with methyl alcohol. |
| | | 3 | | |

LOG OF OPERATION OF EXTRUDER (11)

| Time; hrs.:min. | Temp., °C./V-1 | Pressure (p.s.i.g.) V-1 | V-2 | V-3 | Pumping rate of (9), lbs./hr. | Remarks |
|---|---|---|---|---|---|---|
| 12:15 | | | | | 43 | Started feed of polymermonomer solution from reactor (5). |
| 12:30 | 26.7 | 28 | 5 | 5 | 54 | |
| 12:40 | 31.1 | 34 | 12 | 12 | 43 | |
| 13:00 | 30.0 | 33 | 13 | 12 | 43 | |
| 13:30 | 33.3 | 37 | 10 | 8 | 43 | |
| 14:00 | 35.0 | 40 | 8 | 7 | 43 | |
| 14:30 | 38.9 | 47 | 16 | 14 | 43 | |
| 15:00 | 43.6 | 56 | 25 | 12 | 43 | |
| 15:15 | 45.2 | 59 | 12 | 8 | 54 | |
| 15:30 | 46.9 | 62 | 31 | 31 | 54 | |
| 16:00 | 45.8 | 60 | 30 | 30 | 54 | |
| 16:20 | 47.4 | 63 | 30 | 30 | 43 | |
| 16:30 | 45.8 | 60 | 30 | 30 | 43 | |
| 17:00 | 51.8 | 72 | 30 | 30 | 43 | Mooney of product 14. |
| 17:30 | 51.2 | 71 | 30 | 30 | 43 | Rate of production dry polymer 10 lbs./hr. |
| 18:00 | 51.2 | 71 | 30 | 30 | 32 | Mooney of product 18. |
| 18:30 | 51.8 | 72 | 30 | 30 | 32 | Rate of production dry polymer 16.8 lbs./hr. |
| 19:00 | 51.8 | 72 | 30 | 30 | 32 | Mooney of product 30.5. |
| 19:20 | 51.8 | 72 | 30 | 30 | 32 | Mooney of product 37. |
| 19:30 | 35.0 | 40 | 30 | 30 | 54 | |
| 20:00 | 51.8 | 72 | 30 | 30 | 32 | |
| 20:30 | 40.6 | 50 | 30 | 30 | 32 | |
| 21:00 | 49.0 | 67 | 35 | 35 | 43 | |
| 21:30 | 51.8 | 72 | 30 | 30 | 43 | |
| 21:40 | 51.8 | 72 | 30 | 30 | 43 | Terminate run. |

Over a two-hour period of the approximately nine hours of multi-zone continuous polymerization above described, a 25-pound sample of dry, solid polybutadiene rubber was collected. This polybutadiene had a DSV of 2.02 and a Mooney ML$_4$ @ 100° C. in the range of 33 to 37. The microstructure of this product was 33.3% cis-1,4, 55.5% trans-1,4 and 11.2% 1,2-addition product.

In continuous multi-zone bulk polymerization of butadiene-1,3 according to the invention, the temperature of polymerizing in the initial zone should be maintained in the range of about 30° C. to 50° C. The temperature in zones subsequent to the initial zone is maintained in the range of 50° C. to 150° C.

What is claimed is:
1. A process for bulk polymerizing conjugated dienes in the absence of inert solvent comprising:
   (1) polymerizing in an initial zone liquid monomer including butadiene-1,3 with a hydrocarbon lithium-containing catalyst at a temperature controlled to be not substantially in excess of about 50° C. by evaporating and condensing a portion of said monomer until a polymer-monomer solution of a polymer concentration of from 20 to 40% is obtained, and
   (2) continuing polymerization of said polymer-monomer solution to dry polymer in at least one subsequent zone at a temperature controlled to be in the range of 50° C. to 150° C. by evaporating and condensing a portion of the monomer from the polymer-monomer solution of said subsequent zone,
the evaporated monomer of said initial zone and said subsequent zone being condensed to liquid monomer in a common condensing zone external of said initial and subsequent zones and the condensed liquid monomer being returned to said initial zone.
2. A process in accordance with claim 1 wherein said subsequent zone comprises an extruder provided with controllable vapor venting means communicating with said common condensing zone.

3. A process in accordance with claim 1 wherein monomer and catalyst are continuously introduced into said initial zone, polymer-monomer solution from said initial zone is continuously transferred to and processed in said subsequent zone, and dry, monomer-free polymer is continuously withdrawn from said subsequent zone.

4. A process in accordance with claim 1 wherein said liquid monomer is substantially all butadiene-1,3.

5. A process in accordance with claim 1 wherein said liquid monomer is a mixture of butadiene-1,3 and styrene.

6. A process in accordance with claim 1 wherein said catalyst is n-butyl lithium.

References Cited

UNITED STATES PATENTS

| | | | |
|---|---|---|---|
| 3,062,796 | 11/1962 | Green et al. | 260—94.2 |
| 3,458,490 | 7/1969 | Irwin et al. | 260—94.2 |
| 3,549,726 | 12/1970 | Hanzl | 260—880 |
| 3,554,997 | 1/1971 | Bates et al. | 260—83.7 |
| 3,558,575 | 1/1971 | Keckler | 260—83.7 |

JAMES A. SEIDLECK, Primary Examiner

U.S. Cl. X.R.

260—94.2 M, 94.3